US010916027B2

(12) United States Patent
Sitek et al.

(10) Patent No.: US 10,916,027 B2
(45) Date of Patent: *Feb. 9, 2021

(54) DETERMINING CENTERLINES IN ELONGATED STRUCTURES IN IMAGES TO DETECT ABNORMALITIES

(71) Applicant: INTERNATIONAL BUSINESS MACHINES CORPORATION, Armonk, NY (US)

(72) Inventors: Arkadiusz Sitek, Ashland, MA (US); Yiting Xie, Cambridge, MA (US); Ben Graf, Boston, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 138 days.

This patent is subject to a terminal disclaimer.

(21) Appl. No.: 16/179,272

(22) Filed: Nov. 2, 2018

(65) Prior Publication Data

US 2020/0143556 A1 May 7, 2020

Related U.S. Application Data

(63) Continuation of application No. 16/179,138, filed on Nov. 2, 2018.

(51) Int. Cl.
*G06T 7/60* (2017.01)

(52) U.S. Cl.
CPC ...... *G06T 7/60* (2013.01); *G06T 2207/10072* (2013.01); *G06T 2207/20081* (2013.01);
(Continued)

(58) Field of Classification Search
CPC ............. G06T 7/60; G06T 2207/10072; G06T 2207/20081; G06T 2207/30028; G06T 2207/30101; G06T 2207/30172
(Continued)

(56) References Cited

U.S. PATENT DOCUMENTS 6,782,284 B1 8/2004 Subramanyan et al.
6,842,638 B1 1/2005 Suri et al.
(Continued)

FOREIGN PATENT DOCUMENTS

CN 108122616 A 6/2018
WO 2017091835 A2 6/2017

OTHER PUBLICATIONS

Zheng, Y., Liu, D., Georgescu, B. et al., "3D deep learning for efficient and robust landmark detection in volumetric data", International Conference on Medical Image Computing and Computer-Assisted Intervention, (2015), pp. 565-572.
(Continued)

*Primary Examiner* — Michael R Neff
(74) *Attorney, Agent, or Firm* — Michael Best & Friedrich LLP

(57) ABSTRACT

Systems and methods for determining an abnormality in an elongated structure in a three dimensional medical image. One system includes an electronic processor. The electronic processor is configured to determine a centerline of the elongated structure in the three dimensional medical image and determine a plurality of two dimensional cross sections of the three dimensional medical image based on the centerline. For each two dimensional cross section of the plurality of two dimensional cross sections, the electronic processor is configured to convert the two dimensional cross section to polar coordinates, fit a line to the elongated structure in the two dimensional cross section converted to polar coordinates, and reconvert the two dimensional cross section to Cartesian coordinates.

16 Claims, 6 Drawing Sheets
(3 of 6 Drawing Sheet(s) Filed in Color)

(52) U.S. Cl.
CPC ............... *G06T 2207/30028* (2013.01); *G06T 2207/30101* (2013.01); *G06T 2207/30172* (2013.01)

(58) Field of Classification Search
USPC ........................................................ 382/131
See application file for complete search history.

(56) References Cited

U.S. PATENT DOCUMENTS

| | | |
|---|---|---|
| 8,494,240 B2 | 7/2013 | Milstein et al. |
| 2015/0131880 A1 | 5/2015 | Wang et al. |
| 2017/0262733 A1 | 9/2017 | Gulsun et al. |
| 2018/0005372 A1 | 1/2018 | Wang et al. |
| 2018/0137244 A1 | 5/2018 | Sorenson et al. |
| 2018/0315505 A1 | 11/2018 | Itu et al. |
| 2019/0365310 A1 | 12/2019 | Stidham et al. |
| 2020/0143555 A1* | 5/2020 | Sitek .......................... G06T 7/60 |

OTHER PUBLICATIONS

Orlando, J. I., & Blaschko, M., "Learning fully-connected CRFs for blood vessel segmentation in retinal images", International Conference on Medical Image Computing and Computer-Assisted Intervention, (2014), pp. 634-641.
Unites States Patent Office Action for U.S. Appl. No. 16/179,138 dated Apr. 9, 2020 (12 pages).
United States Patent Office Notice of Allowance for U.S. Appl. No. 16/179,138 dated Jul. 31, 2020 (7 pages).
United States Patent Office Notice of Allowance for U.S. Appl. No. 16/179,138 dated Aug. 31, 2020 (5 pages).

* cited by examiner

DETERMINING CENTERLINES IN ELONGATED STRUCTURES IN IMAGES TO DETECT ABNORMALITIES

RELATED APPLICATIONS

This application is a continuation of U.S. patent application Ser. No. 16/179,138 filed Nov. 2, 2018, the entire content of which is incorporated by reference herein.

FIELD

Embodiments described herein relate to creating a training set used to teach artificial intelligence based software to determine centerlines of elongated structures in images, such as three dimensional medical images, and using the determined centerlines to determine abnormalities in the elongated structures in the three dimensional medical images.

SUMMARY

Three dimensional medical scanners, such as X-ray computed tomography (CT) scanners and magnetic resonance imaging (MM) scanners, are used to capture three dimensional images of the interior of the human body. The amount of information generated by three dimensional medical scanners is staggering, and the large amount of information generated by the three dimensional medical scanners puts a large cognitive load and time constraint on a radiologist reviewing the information for abnormalities. Advances in computerized image analysis and deep learning (artificial intelligence software or systems) are easing the cognitive load put on radiologists by providing ways to review three dimensional medical images for abnormalities faster and semi-automatically (or fully automatically).

However, to determine the centerline of the elongated structure using artificial intelligence software, such as a convolutional neural network, the artificial intelligence software must be trained. Training the artificial intelligence software requires a training set of three dimensional images with marked or known centerlines. Also, a different training set needs to be developed for each elongated structure being processed by artificial intelligence software. Developing a training set is a time consuming and laborious process. For example, to create a training example included in the training set a user must manually determine the centerline of the elongated structure in the applicable image by marking the location of the centerline on each slice of a three dimensional image that includes the centerline. For example, FIGS. 1A and 1B illustrate two slices of a three dimensional medical image. The slice illustrated in FIG. 1A is an axial view, and the slice illustrated in FIG. 1B is a coronal view. In existing systems, a user may need to accurately mark a centerline in each of the slices to include these slices in the training information for the artificial intelligence software. Accordingly, building a set of training information in this manner is a laborious process.

To speed up the process of creating a training set for training artificial intelligence software, embodiments described herein provide systems and methods for building a training set for an artificial intelligence system, which is used to train the artificial intelligence system to automatically determine the centerline of an elongated structure. The training set may include one or more training examples and each training example may be generated based on a plurality of reference points marked (manually) in a subset of slices of three dimensional medical images, such as one or more reference points provided in every predetermined number of slices. After the centerline of an elongated structure is determined, the centerline is used to detect abnormalities in the elongated structure. Thus, embodiments described herein provide systems and methods for determining an abnormality in an elongated structure in a three dimensional medical image.

For example, one embodiment provides a system for determining an abnormality in an elongated structure in a three dimensional medical image. The system includes an electronic processor. The electronic processor is configured to determine a centerline of the elongated structure in the three dimensional medical image and determine a plurality of two dimensional cross sections of the three dimensional medical image based on the centerline. For each two dimensional cross section of the plurality of two dimensional cross sections, the electronic processor is configured to convert the two dimensional cross section to polar coordinates, fit a line to the elongated structure in the two dimensional cross section converted to polar coordinates, and reconvert the two dimensional cross section to Cartesian coordinates.

Another embodiment provides a method of determining an abnormality in an elongated structure in a three dimensional medical image. The method includes determining a centerline of the elongated structure in the three dimensional medical image and determining a plurality of two dimensional cross sections of the three dimensional medical image based on the centerline. The method also includes, for each two dimensional cross section of the plurality of two dimensional cross sections, converting the two dimensional cross section to polar coordinates, fitting a line to the elongated structure in the two dimensional cross section converted to polar coordinates, and reconverting the two dimensional cross section to Cartesian coordinates.

Yet another embodiment provides a system for generating a training example to train artificial intelligence software to automatically determine a centerline of an elongated structure of three dimensional images. The system includes an electronic processor that is configured to receive a plurality of reference points for a subset of a plurality of slices of a first three dimensional image and receive a selection of a starting reference point within the plurality of reference points. Each of the plurality of reference points marks a centerline of the elongated structure within one of the subset of the plurality of slices. The electronic processor is also configured to determine an order of the plurality of reference points and fit a spline curve to the plurality of reference points based on the order of the reference points to define a marked centerline of the three dimensional image to create the training example. The electronic processor is further configured to add the training example to a training set and use the training set to train the artificial intelligence software to automatically determine a centerline of an elongated structure in a second three dimensional medical image.

A further embodiment provides a method of generating a training example to train artificial intelligence software to automatically determine a centerline of an elongated structure of three dimensional images. The method includes receiving a plurality of a reference points for a subset of a plurality of slices of a first three dimensional image and receiving a selection of a starting reference point within a plurality of reference points. Each of the plurality of reference points marking a centerline of the elongated structure within one of the subset of the plurality of slices. The method also includes determining an order of the plurality of reference points and fitting a spline curve to the plurality of reference points based on the order reference points based on the order of the reference points to define a marked centerline of the three dimensional image to create a training example. The method further includes adding the training example to a training set and using the training set to train the artificial intelligence software to automatically determine a centerline of an elongated structure in a second three dimensional image.

Other aspects of the embodiments will become apparent by consideration of the detailed description and accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1A:
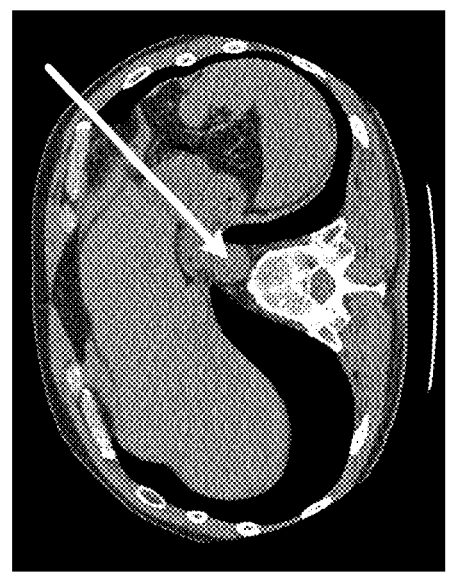
FIG. 1A illustrates an example of an axial slice of a three dimensional medical image of a torso including a reference point.

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

As noted above, embodiments described herein provide systems and methods for generating a training set including a plurality of training examples for training artificial intelligence software to detect a centerline in a three dimensional image, such as a medical image. As described in more detail below, to create a training example for the training set, a user places a reference point within a predetermined number or frequency of slices in a three dimensional medical image marking the centerline. The systems and methods described herein use the reference points to determine the centerline of the elongated structure in the three dimensional image, and the three dimensional image with the determined centerline (represented as a plurality of slices) is added to the training set as a training example.

Figure 2:
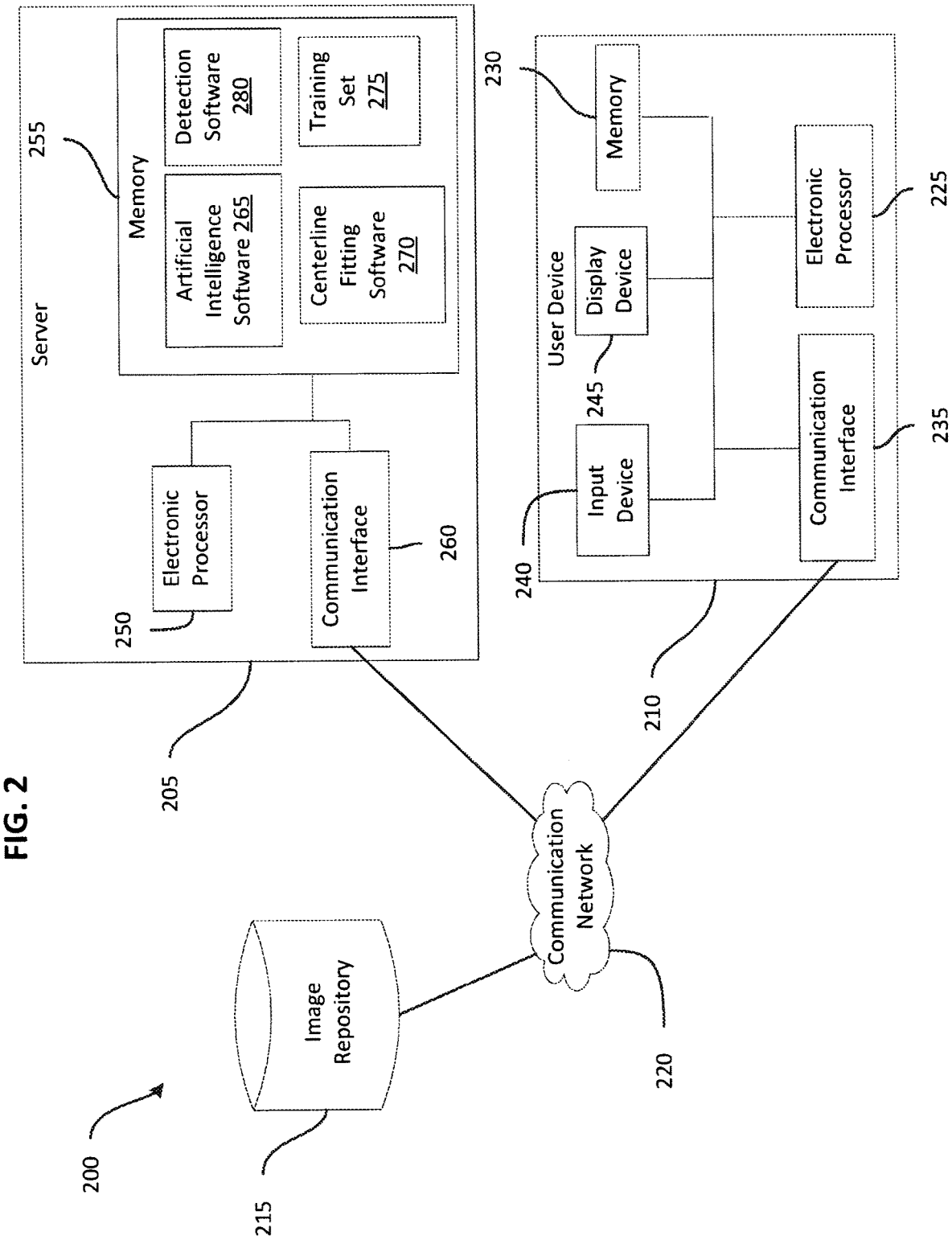
FIG. 2 illustrates a system for generating a training example to train artificial intelligence software to determine a centerline of an elongated structure in a three dimensional image according to one embodiment.

For example, FIG. 2 illustrates a system 200 for generating a centerline of an elongated structure in a three dimensional image according to one embodiment. As illustrated in FIG. 2, the system 200 includes a server 205, a user device 210, and an image repository 215. The user device 210, server 205, and image repository 215 communicate over one or more wired or wireless communication networks 220. Portions of the wireless communication networks 220 may be implemented using a wide area network, such as the Internet, a local area network, such as a Bluetooth™ network or Wi-Fi, and combinations or derivatives thereof. It should be understood that each server included in the system 200 may communicate with a different number of user devices, and the user devices 210 illustrated in FIG. 2 are purely for illustrative purposes. Similarly, it should also be understood that the system 200 may include more or fewer servers and the single server 205 illustrated in FIG. 2 is purely for illustrative purposes. It should also be understood that the system 200 may include more or fewer image repositories and the single image repository 215 is purely for illustrative purposes. Also, in some embodiments, the user device 210 may communicate with the server 205 through one or more intermediary devices (not shown).

The user device 210 includes an electronic processor 225, a memory 230, a communication interface 235, an input device 240, and a display device 245. The electronic processor 225, memory 230, communication interface 235, input device 240, and display device 245 communicate wirelessly, over wired communication channels or buses, or a combination thereof. The user device 210 may include additional components than those illustrated in FIG. 2 in various configurations. For example, in some embodiments, the user device 210 includes multiple electronic processors, multiple memory modules, multiple input devices, multiple display devices, multiple communication interfaces, or a combination thereof. For example, although only a single input device 240 is illustrated in FIG. 2, in some embodiments, the user device 210 may include multiple input devices, for example, a keypad, a keyboard, a mouse, a touchscreen (for example, as part of the display device 245), a microphone, a camera, or the like (not shown). Also, it should be understood that the functionality described herein as being performed by the user device 210 may be performed in a distributed nature by a plurality of computers located in various geographic locations. For example, the functionality described herein as being performed by the user device 210 may be performed by a plurality of computers included in a cloud computing environment. Similarly, in some embodiments, the functionality described herein as being performed by the user device 210, or a portion thereof, may be performed by the server 205.

The electronic processor 225 included in the user device 210 may be a microprocessor, an application-specific integrated circuit (ASIC), and the like. The electronic processor 225 is generally configured to execute software instructions to perform a set of functions, including the functions described herein or a portion thereof. The memory 230 includes a non-transitory computer-readable medium and stores data, including instructions that are executable by the electronic processor 225. The communication interface 235 may be, for example, a wired or wireless transceiver or port, for communicating over the communication network 220 and, optionally, one or more additional communication networks or connections. The display device 245 may be, for example, a touchscreen, a liquid crystal display (LCD), a light-emitting diode (LED) display, an organic LED (OLED) display, an electroluminescent display (ELD), or the like for displaying information to a user of the user device 210. Similarly, the input device 240 includes a device for receiving information from a user, such as, for example, a keypad, a keyboard, a mouse, a touchscreen (for example, as part of the display device 245), a microphone, a camera, or the like.

In some embodiments, three dimensional images including elongated structures are stored in the image repository 215. The image repository 215 may be, for example, a picture archiving and communication system (PACS), a cloud storage environment, or the like. The three dimensional images stored in the image repository 215 are generated by an imaging modality (not shown), such as an X-ray computed tomography (CT) scanner, a magnetic resonance imaging (MRI) scanner, or the like. In some embodiments, the image repository 215 may also be included as part of an imaging modality.

The user device 210 communicates with image repository 215 via the communication interface 235 to request and receive a three dimensional image from the image repository 215. A user may request specific images from the image repository for review or the user device 210 may be configured to automatically request images, such as by requesting available images meeting various parameters (for example, imaging modality, anatomical structure, patient demographic, or the like). The user device 210 displays received three dimensional images on the display device 245 (as a three dimensional image or as a plurality of two-dimensional slices forming the three-dimensional image (see example slices illustrated in FIGS. 1A and 1B)). The user device 210 also receives a plurality of reference points for a displayed three-dimensional image from a user via the input device 240. As described in more detail below, the plurality of reference points may include one or more reference points in each of a subset of the slices of the three-dimensional image, such as one or more reference points in every predetermined (Nth) slice of the image. The received reference points mark points on a center line of an elongated structure in the three dimensional image. The reference points may not be received in any particular order, however, in some embodiments, a selection of a starting reference point is received via the input device 240. The user device 210 may send the three dimensional image and the associated reference points to the server 205 via the communication interface 235.

As illustrated in FIG. 2, the server 205 includes an electronic processor 250, a memory 255, and a communication interface 260. The electronic processor 225, memory 230, and communication interface 235 communicate wirelessly, over wired communication channels or buses, or a combination thereof. The server 205 may include additional components than those illustrated in FIG. 2 in various configurations. For example, in some embodiments, the server 205 includes multiple electronic processors, multiple memory modules, multiple communication interfaces, or a combination thereof. Also, it should be understood that the functionality described herein as being performed by the server 205 may be performed in a distributed nature by a plurality of computers located in various geographic locations. For example, the functionality described herein as being performed by the server 205 may be performed by a plurality of computers included in a cloud computing environment.

The electronic processor 250 may be a microprocessor, an application-specific integrated circuit (ASIC), and the like. The electronic processor 250 is generally configured to execute software instructions to perform a set of functions, including the functions described herein. The memory 255 includes a non-transitory computer-readable medium and stores data, including instructions that are executable by the electronic processor 250. The communication interface 260 may be, for example, a wired or wireless transceiver or port, for communicating over the communication network 220 and, optionally, one or more additional communication networks or connections. As illustrated in FIG. 2, the memory 255 of the server 205 includes artificial intelligence software 265, centerline fitting software 270, and a training set 275. It should be understood that, in some embodiments, the functionality described herein as being provided by the artificial intelligence software 265 and centerline fitting software 270 may be distributed and combined in various configurations. The artificial intelligence software 265 may be, for example, supervised machine learning software such as a neural network, a Bayesian network, a support vector machine, or the like. In some embodiments, the memory 255 also includes detection software 280. The detection software 280 is, for example, medical diagnostic software. The type of medical diagnostic software the detection software 280 is may be dependent on the elongated structure the artificial intelligence software 265 is trained to detect the centerline of. For example, in some embodiments, the artificial intelligence software 265 is trained to detect the centerline of an aorta (or other major artery), a colon, an esophagus, or a different elongated anatomical structure.

The artificial intelligence software 265 stored in the memory 255 of the server 205 is configured to automatically determine the centerlines of elongated structures in three dimensional images when executed by the electronic processor 250. The training set 275 includes a plurality of three dimensional images including elongated structures with a marked or known centerline. The training set 275 is provided to the artificial intelligence software 265 to train the software 265 to automatically determine the centerline of an elongated structure in other three dimensional medical images, such as images that have not yet been analyzed and, thus, do not have marked or known centerlines. Training the artificial intelligence software 265 includes presenting the artificial intelligence software 265 with a plurality of images that have elongated structures with unmarked but known centerlines (the training set 275). For each of the three dimensional images, the artificial intelligence software 265 predicts the location of the centerline of the elongated structure in the three dimensional image. The prediction of the location of the centerline made by the artificial intelligence software 265 is compared to the known location of the centerline in the three dimensional image. In response to a difference (exceeding a minimum threshold) between the location of the centerline determined by the artificial intelligence software 265 and the known location of the centerline in the three dimensional image, adjustments are made to the artificial intelligence software 265. The process of predicting the location of the centerline, comparing the predicted location of the centerline with the known correct centerline location, and adjusting the artificial intelligence software 265 is repeated until the artificial intelligence software 265 predicts the location of the centerline with at least a predetermined level of accuracy.

Figure 1B:
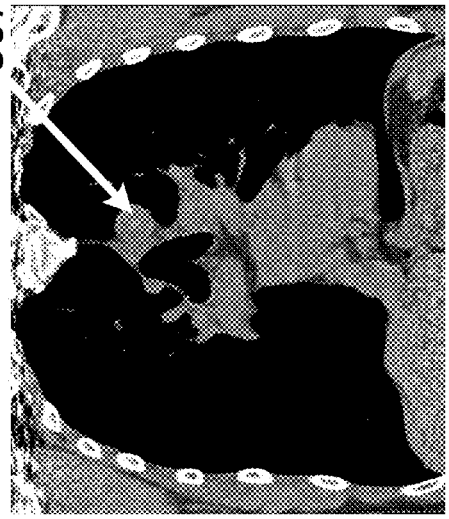
FIG. 1B illustrates an example of a coronal slice of a three dimensional medical image of a torso including a reference point.

The centerline fitting software 270 is configured to create the training set 275 for training artificial intelligence software 265. The centerline fitting software 270 is configured to receive, from the user device 210, a three dimensional image and a plurality of reference points associated with the three dimensional image. The reference points are located on the centerline of the elongated structure in the three dimensional image and may be placed within a predetermined number or frequency, such as every predetermined number of slices in the three dimensional image. In some embodiments, the slice that the reference point is placed in may be an axial view slice, as illustrated in FIG. 1A, or a coronal view slice, as illustrated in FIG. 1B, depending on the orientation of the elongated structure in the three dimensional medical image. The centerline fitting software 270 is configured to connect the reference points to automatically determine the centerline of the elongated structure within the three dimensional image, as described below with reference to FIG. 3.

Figure 3:
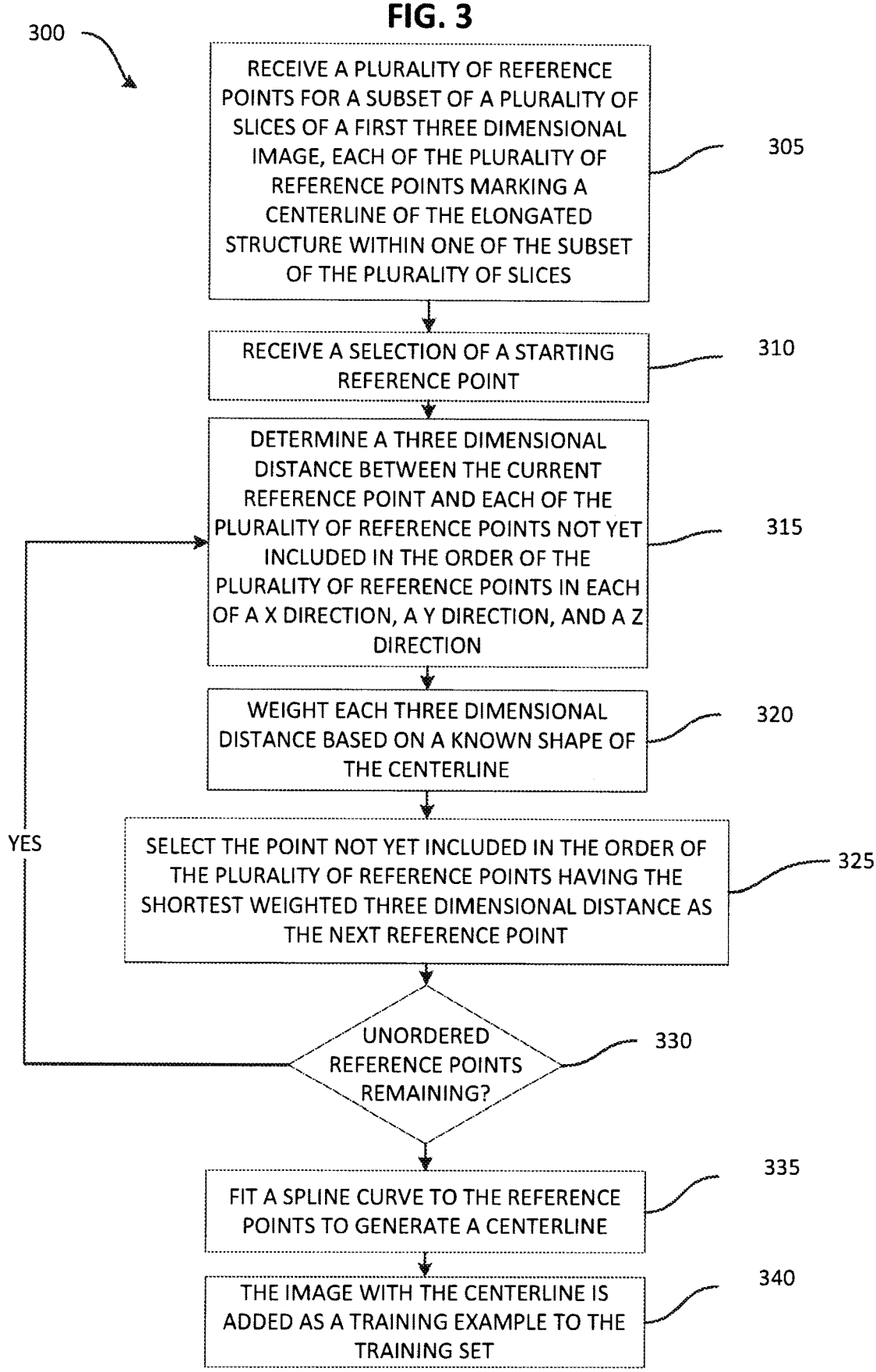
FIG. 3 is a flow chart illustrating a method for generating a training example to train artificial intelligence software to determine a centerline of an elongated structure in a three dimensional image according to one embodiment.

FIG. 3 illustrates a method 300 of generating a training example to train the artificial intelligence software 265 to determine a centerline of an elongated structure in a three dimensional image. The method 300 as described herein may be performed by the system 200 when the centerline fitting software 270 is executed by the electronic processor 250 of the server 205. However, as noted above, the functionality performed by the server 205 may be combined and distributed in various configurations. As illustrated in FIG. 3, the method 300 includes receiving, from the user device 210, a plurality of reference points for a subset of a plurality of slices of a three-dimensional image (at block 305). For example, as noted above, a user may use the input device 240 of the user device 210 to manually add the reference points to the three-dimensional image. In some embodiments, the user device 210 also submits the three-dimensional image associated with the reference points to the server 205. However, in other embodiments, the user device 210 may provide an identifier of the three-dimensional image, which the server 205 may use to access the image from the image repository 215 or another source (for example, a local cache).

As described above, the reference points represent the location of the centerline of the elongated structure in the three dimensional image as manually marked by the user of the user device 210. Each of the plurality of reference points may be included in one of the plurality of slices of the three-dimensional image, and the slices including the reference points may represent a subset of the slices included in the three-dimensional image. For example, in some embodiments, a user provides at least one reference point in at least every predetermined (Nth) number of image slices, such as one or more reference points every ten slices. FIGS. 1A and 1B illustrate example reference points 307A and 307B (pointed to by the white arrows included in these figures for illustration purposes) marked by a user in a slice of a three-dimensional image.

Figure 4:
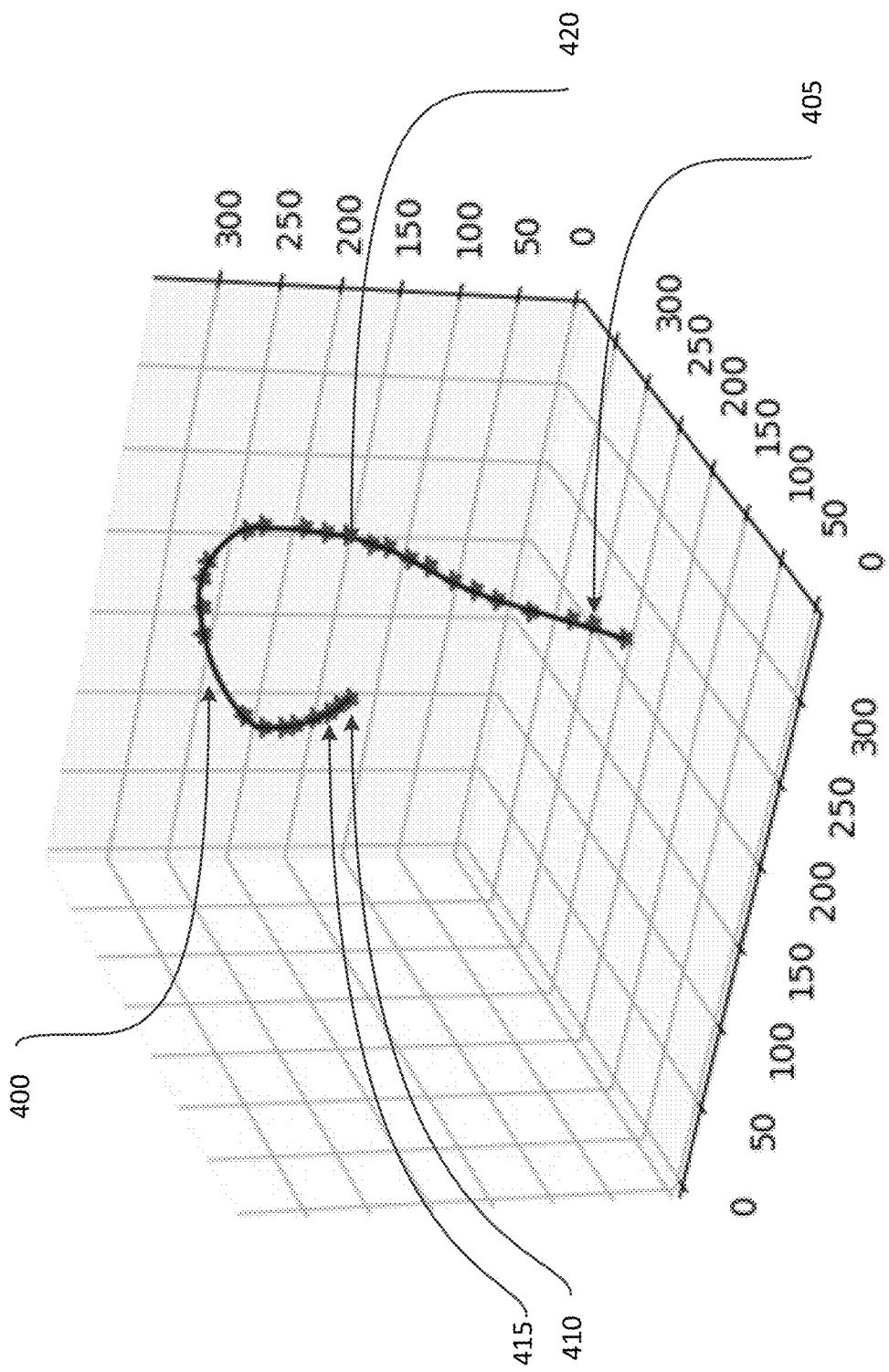
FIG. 4 illustrates an example of a centerline of an elongated structure in three dimensional space that has been determined from a plurality of reference points manually annotated in a subset of slices of a three dimensional image.

In some embodiments, the electronic processor 250 also receives a selection of a starting reference point (at block 310). A user may manually select a starting reference point of the plurality of reference points or the centerline fitting software 270 may be configured to automatically select the starting reference point (for example, based on the order of the reference points, locations of the reference points within the sequences of slices, locations of the reference points within associated slices, or the like). For example, a user may not necessarily provide the reference points in an order corresponding to a dimension of the elongated structure. Accordingly, although the user provides the reference points for the elongated structure, the centerline fitting software 270 may be configured to automatically determine an order of the reference points based on a known shape of the elongated structure. FIG. 4 illustrates an example of a centerline 400 of an elongated structure in three dimensional space determined from a plurality of reference points 405 provided by the user. The units of the axes in FIG. 4 are pixels. In determining the centerline 400, the centerline fitting software 270 may be configured to determine a sequence of points using this known hook shape. For example, when determining the point that follows a point at the end of the hook (for example, the point 410, which may represent a starting reference point), the electronic processor 250 determines the next ordered point along the centerline is the point 415 rather than the point 420 even when the point 420 is closer to the point 410 than the point 415 is in at least one dimension. In particular, the electronic processor 250 sets the point 415 to be the next point rather than the point 420 because the electronic processor 250 weights the distances between reference points in an image based on the position of the reference points in the elongated structure and the expected or known shape as described in further detail below.

For example, beginning with the starting reference point as a current reference point, the electronic processor 250 determines the next reference point in the centerline to determine the order of the reference points, which defines the centerline. The order of the reference points in the centerline is the order that the reference points are connected to represent the centerline. As generally described above, the electronic processor 250 may determine the next reference point by determining a three dimensional distance from the current reference point to each remaining reference point in the three dimensional image that has not been included in the order of the reference points (at block 315). The electronic processor 250 weights each of the determined three dimensional distances with a weight (associates each of the three dimensional determined distances with a weight) that depends on the position of the reference point in a known shape of the elongated structure (for example, if the elongated structure is an artery, an esophagus, or a colon) and an expected positon of the next reference point along the known shape of the centerline (block 320). For example, if the centerline for a particular elongated structure has a hook shape and a current point is located at the curved end of the hook, a reference point other than the reference point that is the closest to the current point may be set as the next point. In other words, the electronic processor 250 determines the next reference point to be the reference point with the shortest weighted three dimensional distance from the current reference point that is not yet included in the order of the reference points (at block 325). The electronic processor 250 determines whether there are any reference points in the three dimensional image that are not included in the order of the reference points of the centerline (block 330). While there are reference points in the three dimensional image that have not been included in the order of the reference points in the centerline, the electronic processor 250 proceeds to determine the next reference point in the centerline (block 315). In response to every reference point in the three dimensional image being included in the order of the reference points of the centerline, the electronic processor 250 fits a curve (for example, a spline curve) to the reference points based on the order of the reference points, creating a three dimensional image with a marked centerline (block 335), which is added as a training example to the training set 275 (block 340).

After a plurality of training examples have been determined for an elongated structure and included in the training set 275, the electronic processor 250 uses the training set 275 to train the artificial intelligence software 265 to automatically determine the centerline of an elongated structure in a three dimensional image, such as a three dimensional image that has not been analyzed (with an unknown or unverified centerline).

Figure 5:
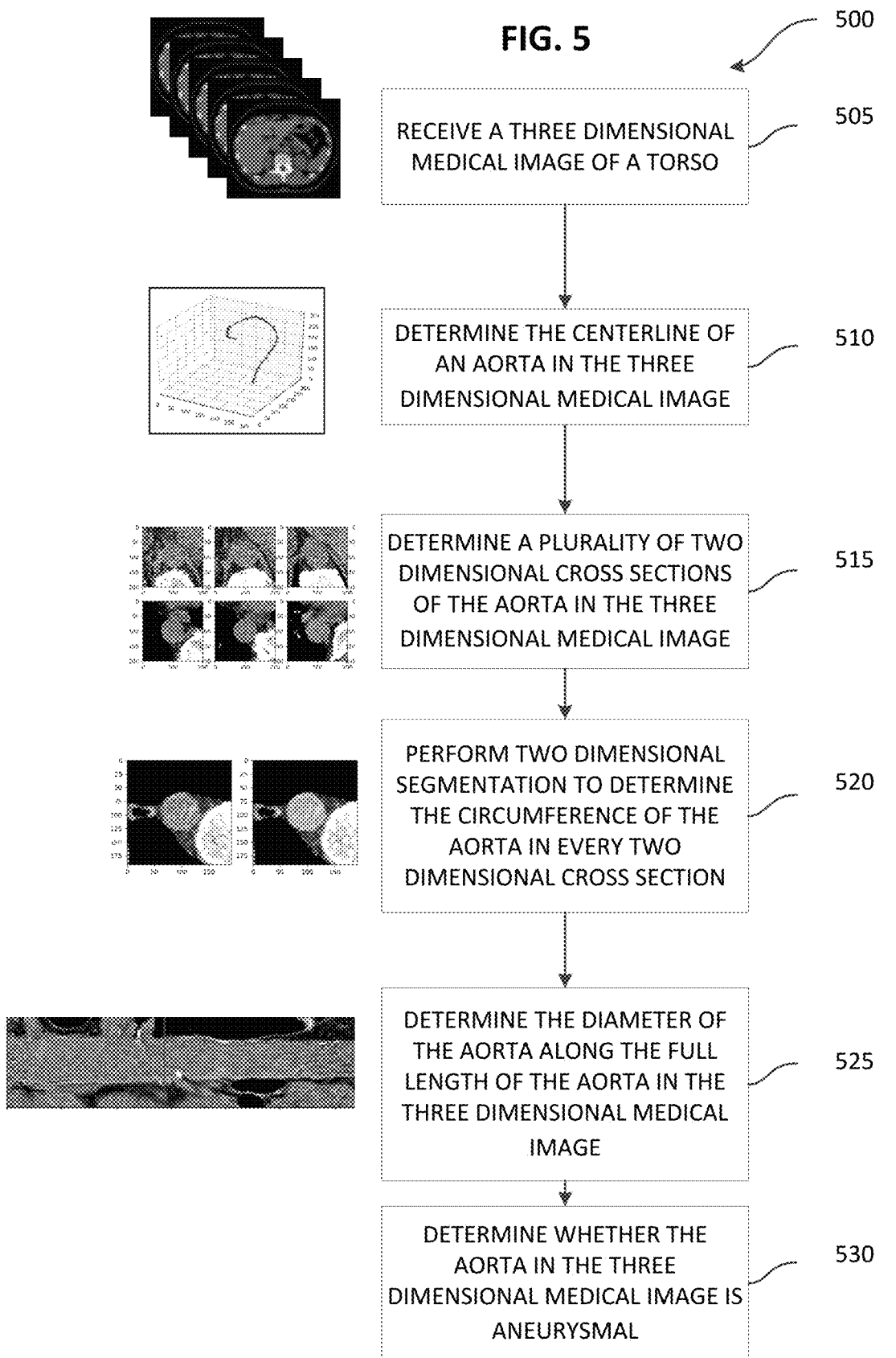
FIG. 5 is a pictorial illustration and a flow chart illustrating a method of determining whether an elongated structure in a three dimensional medical image is aneurysmal according to one embodiment.

After the artificial intelligence software 265 is trained, the artificial intelligence software 265 may be used in combination with the detection software 280 to determine an abnormality in an elongated structure in a three dimensional medical image. For example, FIG. 5 illustrates a method 500, as performed by the system 200 when the electronic processor 250 executes the detection software 280, of determining when an elongated structure in a three dimensional medical image is aneurysmal. As illustrated in FIG. 5, the method 500 includes receiving, with the electronic processor 250, a three dimensional medial image of a torso, such as from the image repository 215 via the communication interface 260 (at block 505). The electronic processor 250 executes the artificial intelligence software 265 to automatically determine the centerline of the aorta in the three dimensional medical image. The artificial intelligence software 265 in this example has been trained using a training set (for example, the training set 275) that includes a plurality of training examples wherein the centerline of the aorta has been determined using the method 300 described above. After the centerline of the aorta is determined in the three dimensional medical image by the artificial intelligence software 265 (at block 510), the electronic processor 250 executes the detection software 280 to determine a plurality of two dimensional cross sections of the aorta in the three dimensional image (at block 515). The electronic processor 250 then performs two dimensional segmentation to determine the circumference of the aorta in every two dimensional cross section (at block 520).

Figure 6:
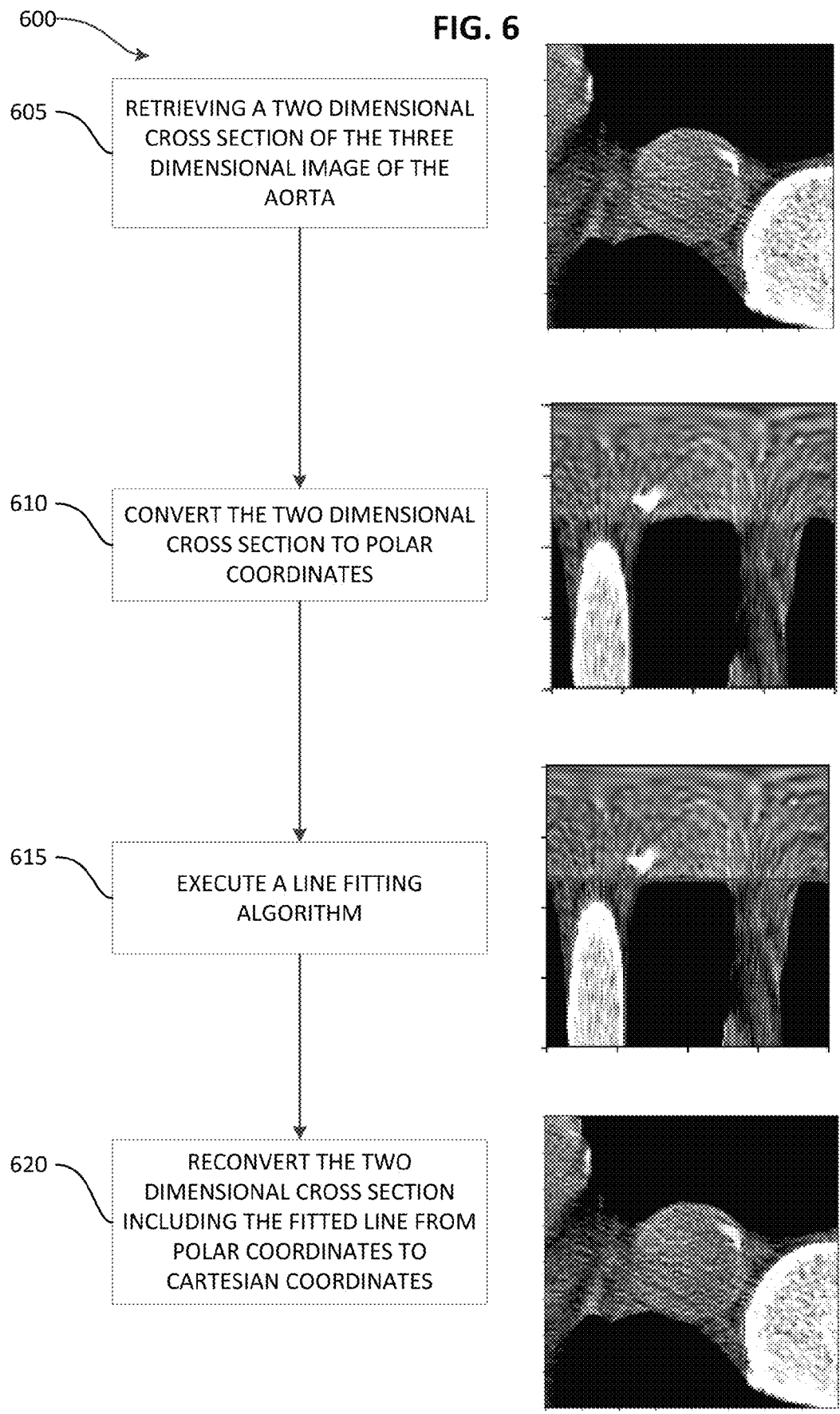
FIG. 6 is a pictorial illustration and a flow chart illustrating a method of determining a two dimensional segmentation on a two dimensional cross section of a three dimensional image of an elongated structure according to one embodiment.

FIG. 6 graphically illustrates a method 600 for performing two dimensional segmentation. The method 600 includes retrieving a two dimensional cross section of the three dimensional medical image of the aorta (at block 605). As shown in FIG. 6, the electronic processor 250 converts the two dimensional cross section to polar coordinates (at block 610). Converting the two dimensional cross section to polar coordinates causes the circumference of the aorta to appear as a semi-straight line. A line fitting algorithm is executed by the electronic processor 250 to fit a line to the perimeter of the aorta (at block 615). The electronic processor 250 reconverts the two dimensional cross section including the fitted line to Cartesian coordinates (at block 620). The area inside the fitted line included in the two dimensional cross section reconverted to Cartesian coordinates is the area of the two dimensional image that includes the aorta. Returning to the method 500, by performing two dimensional segmentation on each two dimensional cross section of the aorta the diameter of the aorta along the full length of the aorta may be determined (at block 525). Using the determined diameters of the aorta, the electronic processor 250 may determine when the aorta in the three dimensional medical image is aneurysmal, such as by determining if the diameter of the aorta ever exceeds a predetermined threshold (block 530).

It should be understood that embodiments described above should not be considered limiting. For example, the embodiments described above are not limited medical uses. The embodiments described above may be applied to different types of images for different types of elongated structures.

Thus, the embodiments herein provide, among other things, a system for determining the centerline in a three dimensional image using deep learning, wherein the deep learning is performed using a training set of training examples generated using reference points provided for a subset of slices of a three dimensional image. Various features and advantages of the invention are set forth in the following claims.

What is claimed is:

1. A system for determining an abnormality in an elongated structure in a three dimensional medical image, the system comprising
  an electronic processor configured to:
    determine a centerline of the elongated structure in the three dimensional medical image;
    determine a plurality of two dimensional cross sections of the three dimensional medical image based on the centerline; and
  for each two dimensional cross section of the plurality of two dimensional cross sections;
    convert the two dimensional cross section to polar coordinates;
    fit a line to the elongated structure in the two dimensional cross section converted to polar coordinates; and reconvert the two dimensional cross section to Cartesian coordinates.

2. The system according to claim 1, wherein the electronic processor is further configured to:
determine a diameter of the elongated structure in the two dimensional cross section; and
when the diameter exceeds a predetermined threshold and the elongated structure is an artery, determine the elongated structure is aneurysmal.

3. The system according to claim 1, wherein the electronic processor is further configured to
determine a diameter of the elongated structure in the two dimensional cross section by using the line fitted to the elongated structure in the two dimensional cross section converted to polar coordinates.

4. The system according to claim 1, wherein the line fitted to the elongated structure in the two dimensional cross section indicates a circumference of the elongated structure.

5. The system according to claim 1, wherein the elongated structure is one selected from the group consisting of an artery, a colon, or an esophagus.

6. The system according to claim 1, wherein the electronic processor is configured to determine the centerline of the elongated structure in the three dimensional medical image by using artificial intelligence software.

7. The system according to claim 6, wherein the electronic processor is further configured to train the artificial intelligence software to determine the centerline of the elongated structure in the three dimensional medical image using a training set including a plurality of training examples.

8. The system according to claim 7, wherein the electronic processor is further configured to create a training example by
receiving a plurality of reference points for a subset of a plurality of slices of a second three dimensional medical image, each of the plurality of reference points marking a centerline of the elongated structure within one of the subset of the plurality of slices of the second three dimensional medical image;
receiving a selection of a starting reference point within the plurality of reference points;
determining an order of the plurality of reference points; and
fitting a spline curve to the plurality of reference points based on the order of the reference points to define a marked centerline of the second three medical dimensional image to create the training example.

9. A method of determining an abnormality in an elongated structure in a three dimensional medical image, the method comprising
determining a centerline of the elongated structure in the three dimensional medical image;
determining a plurality of two dimensional cross sections of the three dimensional medical image based on the centerline; and
for each two dimensional cross section of the plurality of two dimensional cross sections;
converting the two dimensional cross section to polar coordinates;
fitting a line to the elongated structure in the two dimensional cross section converted to polar coordinates; and
reconverting the two dimensional cross section to Cartesian coordinates.

10. The method according to claim 9, the method further comprising:
determining a diameter of the elongated structure in the two dimensional cross section; and
when the diameter exceeds a predetermined threshold and the elongated structure is an artery, determining the elongated structure is aneurysmal.

11. The method according to claim 9, the method further comprising
determining a diameter of the elongated structure in the two dimensional cross section by using the line fitted to the elongated structure in the two dimensional cross section converted to polar coordinates.

12. The method according to claim 9, wherein the line fitted to the elongated structure in the two dimensional cross section indicates a circumference of the elongated structure.

13. The method according to claim 9, wherein the elongated structure is one selected from a group consisting of an artery, a colon, or an esophagus.

14. The method according to claim 9, wherein determining the centerline of the elongated structure in the three dimensional medical image includes using artificial intelligence software to determine the centerline.

15. The method according to claim 14, wherein the method further comprising: training the artificial intelligence software to determine the centerline of the elongated structure in the three dimensional medical image using a training set including a plurality of training examples.

16. The system according to claim 15, the method further comprising:
creating a training example for the plurality of training examples by:
receiving a plurality of reference points for a subset of a plurality of slices of a second three dimensional medical image, each of the plurality of reference points marking a centerline of the elongated structure within one of the subset of the plurality of slices of the second three dimensional medical image;
receiving a selection of a starting reference point within the plurality of reference points;
determining an order of the plurality of reference points; and
fitting a spline curve to the plurality of reference points based on the order of the reference points to define a marked centerline of the second three dimensional medical image to create the training example.

* * * * *